J. J. A. MILLER.
RESILIENT TIRE FOR AUTOMOBILE AND OTHER VEHICLE WHEELS.
APPLICATION FILED AUG. 5, 1913.
1,104,817.
Patented July 28, 1914.
2 SHEETS—SHEET 2.
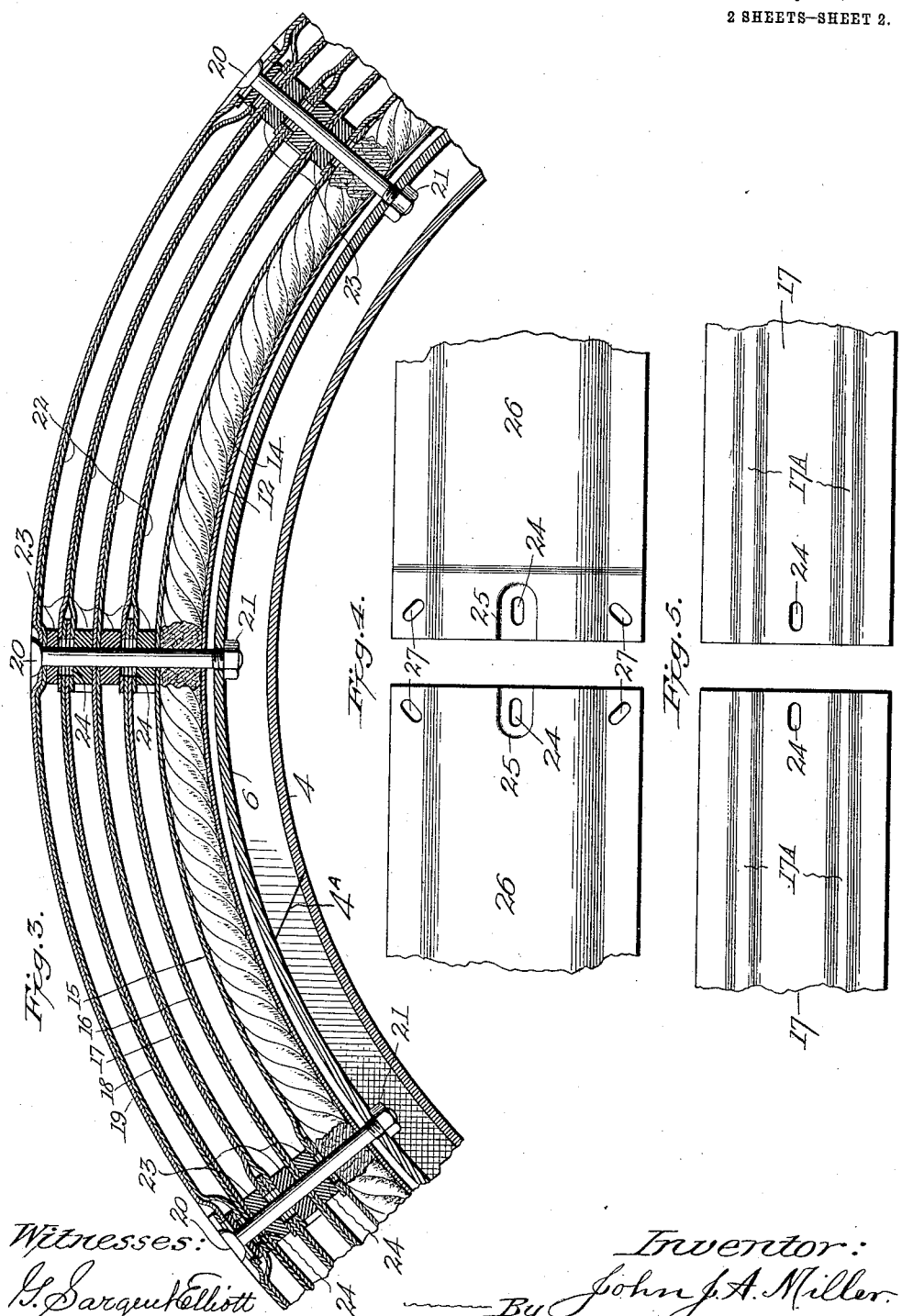

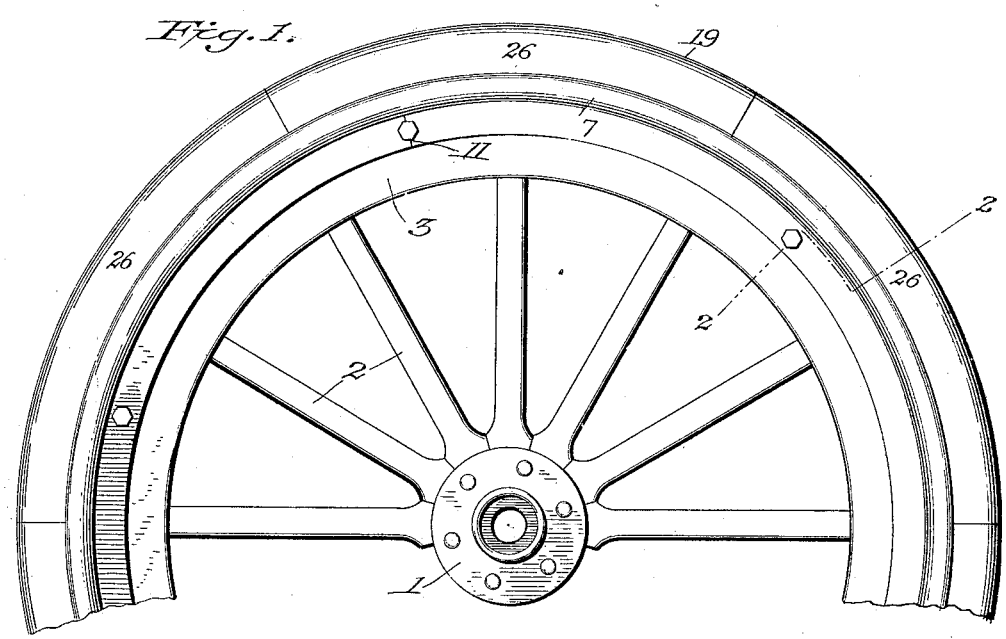
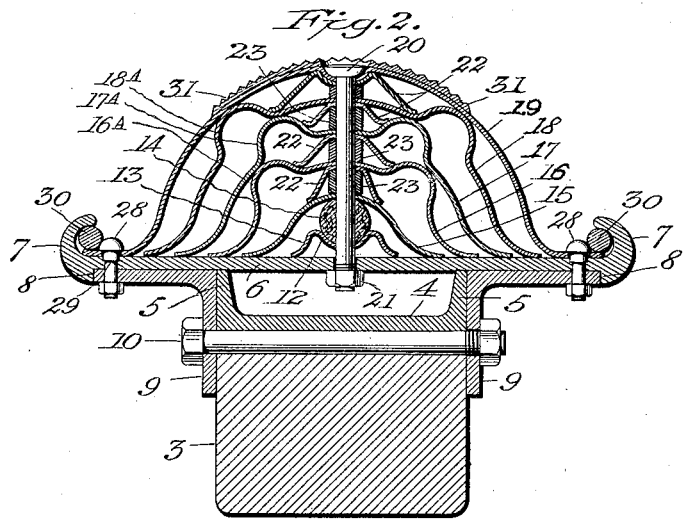

UNITED STATES PATENT OFFICE.

JOHN J. A. MILLER, OF DENVER, COLORADO.

RESILIENT TIRE FOR AUTOMOBILE AND OTHER VEHICLE WHEELS.

1,104,817.  Specification of Letters Patent.  Patented July 28, 1914.

Application filed August 5, 1913. Serial No. 783,087.

*To all whom it may concern:*

Be it known that I, JOHN J. A. MILLER, a citizen of the United States of America, residing in the city and county of Denver and State of Colorado, have invented a new and useful Resilient Tire for Automobile and other Vehicle Wheels, of which the following is a specification.

My invention relates to improvements in resilient tires for automobile wheels; and the objects of my invention are: First, to provide a demountable tire composed of a plurality of concentric metal plates connected to form endless tire sections. And second, to provide a tire for automobiles and other vehicles, comprising a demountable rim, to which is secured a plurality of concentric, continuous resilient metal bands, each of which consists of a plurality of segments so connected to each other as to have a sliding movement one upon the other, at their joint or points of connection, and so connected to the rim as to be capable of lateral expansion under pressure. I attain these objects by the mechanism illustrated in the accompanying drawings, in which:

Figure 1, is a side view of a portion of a wheel, constructed in accordance with my invention. Fig. 2, is an enlarged transverse sectional view of the same, on the line 2—2 of Fig. 1. Fig. 3, is a longitudinal sectional view through a portion of the tire, the felly band and the rim, showing the manner in which the tire sections are connected to each other and to the rim. Fig. 4, is a fragmental plan view showing the end portions of two of the outside tire sections. Fig. 5, is a similar view of two of the inner tire sections.

Similar letters of reference refer to similar parts throughout the several views.

Referring to the drawings,—The numeral 1 designates the hub; 2 designates the spokes; and 3 the felly of an automobile wheel, which parts may be made of any suitable material and of any design in common use, as the wheel in itself does not form any part of my present invention, but is a coöperating part of it.

Upon the felly is secured a divided metal band 4, having parallel annular flanges 5, which project from its opposite side edges a suitable distance, and which form bearing members for a tire rim 6, the division in the band being shown at 4ª, Fig. 3. This rim comprises a flat metal endless band, the edges of which are inwardly rolled, as shown at 7. On the inner face of the rim and adjacent to its rolled edges, are formed annular shoulders 8, and besides resting on the flanges 5, of the felly band, the rim 6 also rests upon the tread portions of divided rings 9, which are L-shaped in cross section, the vertical members thereof resting against the felly and felly band, as clearly shown in Fig. 2. These divided rings 9 are sprung in behind the shoulders 8, of the rim 6, and their vertical members are provided with a plurality of bolt holes through which bolts 10 are passed, and these bolts and rings serve to secure the felly band in place, and the rings also serve to secure the tire rim in place, and so as to prevent lateral movement of the same, the division in each ring occurring at one of the bolt holes, as shown at 11 in Fig. 1. The divided band 4 can be slightly collapsed and sprung within the rim 6 before being placed upon the felly 3. Upon the rim 6 is secured the improved resilient tire, which is made up of a plurality of concentric metal bands, each of which is composed of a plurality of segmental plates or sections, which are arranged in the following manner: Centrally upon the rim 6 rests a spring metal saddle 12, which is of the form in cross section shown in Fig. 2, and comprises the central portion which is semi-circular in cross section, and which terminates in inwardly extending wings or flanges 13, which rest upon the rim 6. This saddle forms a trough-like support for a resilient ring 14, which may be of rope, as shown in Figs. 2 and 3 though any other suitable material may be employed.

Resting upon this resilient ring 14, and also upon the rim 6, is the first cushioning member 15, which, as well as the other cushioning members, is made up of a plurality of segmental plates or sections, six being illustrated, as shown in Fig. 1, and these sections are all secured together, and to the rim 6, by bolts 20, which extend through the various plates, and loosely through holes in the rim 6, so as to extend into the space between the said rim 6 and the felly band, as clearly shown by Figs. 2 and 3. These bolts are equi-distant, and are so spaced that a bolt extends through each end of a segmental plate, and one midway of the length of the same, and the inner ends of these bolts are provided with nuts 21, which may be secured against displacement, in any suitable manner.

Between the first cushioning member 15, which is substantially semi-circular in cross section, and the outer or traction member 19, are spaced concentric members 16, 17, and 18 respectively, which are provided with parallel corrugations 16ᴬ, 17ᴬ, and 18ᴬ respectively, which not only serve to give a proper amount of rigidity to the individual segmental plates, but they are of such a depth that those in one continuous member, say the member 16, contact with the member 17; those on the member 17 contact with the member 18, and those on the member 18 contact with the outer member 19, so that pressure upon the outer or traction member is transmitted successively to the inner cushioning members. Between each two members are interposed continuous supplemental cushioning members 22, which are made up of segmental plates in like manner as the other members, and are substantially of the form of an inverted U in cross section, and on the bolts 20 between the main and supplemental cushion members are interposed blocks 23 of rubber, leather, or any other suitable resilient material. The main and supplemental segmental plates of one member alternate with those of the next member. Or in other words, the bolt which passes through the overlapping ends of the main and supplemental plates of one member, passes through the central portions of the plates of the next member, and the bolt holes 24 in the ends of the various segmental plates are elongated as shown, to permit the plates to slide one upon the other under load pressure. By alternating the plates constituting the several members of the tire, the lateral stress on the bolts is equalized around the tire, and the bolts therefore will always extend in radial lines, and not at a tangent to the axis of the wheel.

The bolt holes 24 extend through the bottoms of depressions 25, which receive the heads of the bolts, so that they will lie flush with the outer face of the tread or traction member 19, as clearly shown in Figs. 2 and 3. The inner members 15, 16, 17 and 18, are secured to the rim by the bolts 20, only, and their edges rest upon and have a lateral sliding movement on the said rim, when the plates are compressed under pressure. The plates constituting the traction member 19, however, must be bolted to the rim along their edges, but so as to allow them to expand laterally, and also in the direction of their length, as will be understood. To accomplish this, the plates 26 of the traction member 19, are provided along their edges with bolt slots 27, which incline at an angle of forty-five degrees, those on the right of the center of a plate inclining toward the right, while those on the left of the center of the plate incline toward the left, and bolts 28 are passed through these slots and through holes in the rim 6, and the divided rings 9, the said bolts 28 having shoulders 29, which bear against the rim 6, and thus prevent the plates 26 from being clamped to the said rim, which would prevent the sliding movement above referred to. These bolts 28 also form additional means for securing the rim to the rings 9. Within the rolled edges 7 of the rim, are housed rings 30, of any suitable resilient material, such as cord or rubber, which will not interfere with the lateral expansion of the plates 26; and these rings 30 prevent either mud or water from working under the edges of the said plates. The plates 26 may be faced with serrated plates 31, as shown in Fig. 2, which are for the purpose of preventing skidding. As the wheel turns, the bolts 20 are pressed in successively, and their inner ends, having the nuts 21, slide through the holes in the rim 6, and into the space between the rim and the band 4, and if the overlapping ends of two of the traction plates 26, are in contact with the road, these plates and the inner plates, together with the bolt, are pressed in, and the ends of the outer or traction plate, and those of the members 15 and 17, slide one upon the other, while the plates of the members 16 and 18, having the pressure at their centers, spread or slide on their opposite ends, and all of the plates expand laterally. When the next bolt contacts with the ground, the outer plates and those of the members 17 and 15, being under pressure at their centers, expand toward their opposite ends, while the ends of the plates of the members 18 and 16, being under pressure, slide upon each other, and so on in like manner throughout the extent of the wheel. The pressure is transmitted from the plates of one member, to those of the next member, until it is received by the resilient ring 14 and its saddle 13, which form the last shock-absorbing element of the tire. The blocks 23, hold the plates in contact, and prevent rattling of the same, as well as of the bolts.

The tire illustrated, comprises five members, together, with the supplemental cushions, but a greater or less number may be employed, and each member may be composed of any practicable number of segmental plates.

Having described my invention, what I claim as new and desire to secure by Letters Patent, is:

1. In a resilient tire, the combination with a rim, of a plurality of spaced circular concentric members having annular corrugations, said members being made up of a plurality of segmental plates, and bolts which extend loosely through said plates and through said rim, having retaining means, such as nuts, on their inner ends, the corrugations of one member bearing upon the member just beyond.

2. In a resilient tire, the combination with a rim, of a plurality of spaced concentric circular members having annular corrugations, those of one member bearing against the adjoining member, said members being made of a plurality of segmental plates substantially semi-circular in cross section, bolts extending through the outer plates along their edges, and through the rim, which permit lateral and endwise expansion of the plates, and radially-disposed bolts which extend through the arch portions of said plates and loosely through the rim, and having nuts on their inner ends.

3. In a resilient tire, the combination with a rim, of a plurality of spaced circular corrugated concentric members, and a plurality of interposed supplemental members, each comprising a plurality of segmental plates substantially semi-circular in cross section, which overlap at their ends, bolts extending loosely through said overlapping ends and midway of the length of the plates, said bolts being slidably mounted in the rim and having nuts on their inner ends, there being inclined slots adjacent to the edges of the outer plates, and bolts which extend through said slots and through the rim.

4. In a resilient tire, the combination with a rim, of a plurality of concentric continuous members substantially semi-circular in cross section, each of which comprises a plurality of segmental corrugated plates, the corrugations of one plate engaging the adjoining plate, the edges of said plates resting upon the rim, annular cushioning rings interposed between each two of said members, each comprising a plurality of segmental plates bow-shaped in cross section, said rings lying between the corrugations of said members, a resilient saddle on the rim, a resilient cushioning element in said saddle, a resilient band bow-shaped in cross section which rests on said cushioning element, and on the rim, and supports the innermost cushioning ring, an outer member comprising a plurality of plates which overlap at their ends and are provided with slots adjacent to their edges, bolts which extend through all of the tire members and loosely through the rim, bolts which extend through the slots in the edges of the outer plates, and resilient blocks on the first mentioned bolts between the plates.

5. In a resilient tire, the combination with a rim, of a plurality of tire members, each made up of corrugated plates which are substantially semi-circular in cross section, and overlap at their ends, an outer member comprising a plurality of overlapping plates, cushion rings interposed between said tire members, which are also made of plates which overlap at their ends, their bearing edges lying between the corrugations of the plate, the plates of one member and its cushioning ring, alternating with those of the adjoining member and its cushion ring, radial bolts slidable in said rim, which pass alternately through the overlapping ends of one set of plates and the centers of the adjoining plates, resilient blocks on the bolts between each cushion ring and the next adjoining member, and a continuous resilient support for the innermost cushioning ring, an endless resilient saddle on the rim, and a resilient element therein which engages said resilient support, and means for securing the edges of the outer plates to the rim so as to permit of lateral and endwise expansion of said plates.

6. In a resilient tire, the combination with a rim having rolled edges, and a plurality of cushioning elements resting thereon, which are made up of segmental corrugated plates substantially semi-circular in cross section, of an outer member comprising a plurality of plates which overlap at their ends, said ends being provided with bolt slots, the edges of said plates extending beneath the rolled edges of said rim and being provided with inclined slots, bolts extending through said slots and through the rim, resilient endless elements in said rolled edges, which rest on the edges of said plates, bolts which extend through the slotted overlapping ends of said plates, and through the cushioning elements, bolts extending centrally through said plates and cushioning elements, said bolts being slidable in said rim and having stops on their inner ends, and resilient blocks on said bolts between the cushioning elements.

7. In a resilient tire, the combination with a rim having concentric cushion rings each comprising a plurality of overlapping sections, of an outer or traction member comprising sections having slotted overlapping ends, bolts extending through said slotted ends, and through the inner sections, bolts which pass centrally through the said plates and inner sections, said bolts being slidable in the rim and having stops on their inner ends, and means for securing said plates to the rim along their edges so as to permit lateral and endwise expansion of the plates.

In testimony whereof I affix my signature in presence of two witnesses.

JOHN J. A. MILLER.

Witnesses:
G. SARGENT ELLIOTT,
ADELLA M. FOWLE.